(12) United States Patent
Sun et al.

(10) Patent No.: US 12,398,998 B2
(45) Date of Patent: Aug. 26, 2025

(54) METHODS FOR HIGH-RESOLUTION, STABLE MEASUREMENT OF PITCH AND ORIENTATION IN OPTICAL GRATINGS

(71) Applicant: Applied Materials, Inc., Santa Clara, CA (US)

(72) Inventors: Yangyang Sun, San Jose, CA (US); Jinxin Fu, Fremont, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 149 days.

(21) Appl. No.: 18/118,269

(22) Filed: Mar. 7, 2023

(65) Prior Publication Data
US 2023/0314126 A1    Oct. 5, 2023

Related U.S. Application Data

(60) Provisional application No. 63/362,427, filed on Apr. 4, 2022.

(51) Int. Cl.
| | |
|---|---|
| *G01B 11/26* | (2006.01) |
| *G02B 3/00* | (2006.01) |
| *G02B 5/30* | (2006.01) |
| *G02B 26/12* | (2006.01) |

(52) U.S. Cl.
CPC ............. *G01B 11/26* (2013.01); *G02B 3/00* (2013.01); *G02B 5/3025* (2013.01); *G02B 26/123* (2013.01); *G02B 2207/123* (2013.01)

(58) Field of Classification Search
CPC .. G02B 2207/123; G02B 26/123; G02B 3/00; G02B 5/3025; G01B 11/14; G01B 11/26; G01B 2210/56
See application file for complete search history.

(56) References Cited

U.S. PATENT DOCUMENTS

| | | | |
|---|---|---|---|
| 2011/0007314 A1 | 1/2011 | Den Boef et al. | |
| 2015/0146272 A1 | 5/2015 | Amano et al. | |
| 2020/0309598 A1 | 10/2020 | Fu et al. | |
| 2020/0393388 A1* | 12/2020 | Makuuchi | G01N 21/94 |

FOREIGN PATENT DOCUMENTS

| | | |
|---|---|---|
| JP | H05026767 | 2/1993 |
| KR | 10-1368486 B1 | 3/2014 |

OTHER PUBLICATIONS

International Search Report and Written Opinion dated Jun. 23, 2023 for International Application No. PCT/US2023/014708.

\* cited by examiner

*Primary Examiner* — Hina F Ayub

(74) *Attorney, Agent, or Firm* — Patterson + Sheridan, LLP

(57) ABSTRACT

Embodiments described herein provide for a measurement system having an aperture filtering component and methods of utilizing the measurement system. The measurement system described herein includes a measurement arm and a stage. The measurement arm projects a light beam to a top surface of an optical device structure. Multi-reflection beams resulting from reflections and diffraction off other surfaces of a non-opaque substrate leads to interference. The measurement arm includes an aperture (e.g., an aperture filtering component) that filters the multi-reflection beams from being relayed to the detector. As such, only images of the light beam are relayed to the detector.

20 Claims, 12 Drawing Sheets

METHODS FOR HIGH-RESOLUTION, STABLE MEASUREMENT OF PITCH AND ORIENTATION IN OPTICAL GRATINGS

CROSS-REFERENCE TO RELATED APPLICATIONS

This application claims the benefit of U.S. Provisional Patent Application Ser. No. 63/362,427, filed Apr. 4, 2022, which is incorporated by reference herein in its entirety.

BACKGROUND

Field

Embodiments of the present disclosure relate to a measurement system. Specifically, embodiments of the present disclosure relate to a measurement system having an aperture filtering component and methods of utilizing the measurement system.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is displaying a virtual image overlaid on an ambient environment. Optical devices are used to assist in overlaying images. Fabricating optical devices can be challenging as optical devices tend to have properties, such as optical device structure pitches and optical device structure orientations that need to be manufactured according to specific tolerances. Measurement devices are utilized to ensure that the intended pitch and orientation is achieved. Conventional systems will experience a decrease in accuracy and repeatability when measuring optical device structures on transparent substrates due to multi-reflection beams interfering with the measurement device. Accordingly, what is needed in the art is an improved measurement device and methods of filtering the multi-reflection beams.

SUMMARY

In one embodiment, a measurement system is provided. The measurement system includes a light source configured to project a light beam to a substrate disposed below the light source, a first lens disposed between the substrate and the light source and configured to focus the light beam to the substrate, and a first beam splitter disposed between the first lens and the light source. The measurement system further includes a second lens disposed adjacent to the first beam splitter and configured to direct the light beam to the second lens, and configured to direct the light beam to a mirror, an aperture disposed in front of the mirror, a second beam splitter configured to direct the light beam to a third lens from the mirror, and a detector with the light beam projected to the detector by the third lens.

In another embodiment, a measurement system is provided. The measurement system includes a stage having a substrate support surface with the stage coupled to a stage actuator configured to move the stage in a scanning path and rotate the stage about an axis, a measurement arm disposed above the stage and configured to direct a light beam to a substrate disposed on the substrate support surface. The measurement arm includes a light source configured to project the light beam to the substrate disposed below the light source, a first lens disposed between the substrate and the light source and configured to focus the light beam to the substrate, a first beam splitter disposed between the first lens and the light source, a second lens disposed adjacent to the beam splitter and configured to direct the light beam to the second lens, an aperture with the second lens configured to direct the light beam through the aperture, a third lens, and a detector with the light beam projected to the detector by the third lens.

In yet another embodiment, a method is provided. The method includes projecting a light beam to a first optical device structure from a measurement arm, the light beam diffracting off a top surface of the first optical device structure of a substrate with the substrate disposed on a stage. The method further includes projecting the light beam through an aperture disposed in front of a mirror in the measurement arm with the aperture operable to allow only the light beam to contact the mirror, relaying a first original image of the light beam to a detector in the measurement arm, moving the stage along a scanning path and projecting the light beam to a second optical device structure. A second original image is relayed to the detector. The method further includes forming a high resolution map of a pitch and orientation angle of at least the first optical device structure and the second optical device structure.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure relate to a measurement system having an aperture filtering component and methods of utilizing the measurement system. A measurement system includes a stage and a measurement arm. Light projected from the measurement arm reflects from a substrate disposed on the stage, and the reflected light from the substrate surface is incident on the measurement arm. A shift of an image projected to a detector will shift when the orientation and/or the pitch of the optical device structures change. Embodiments disclosed herein may be especially useful for, but not limited to, measuring local uniformities in optical systems.

Figure 1:
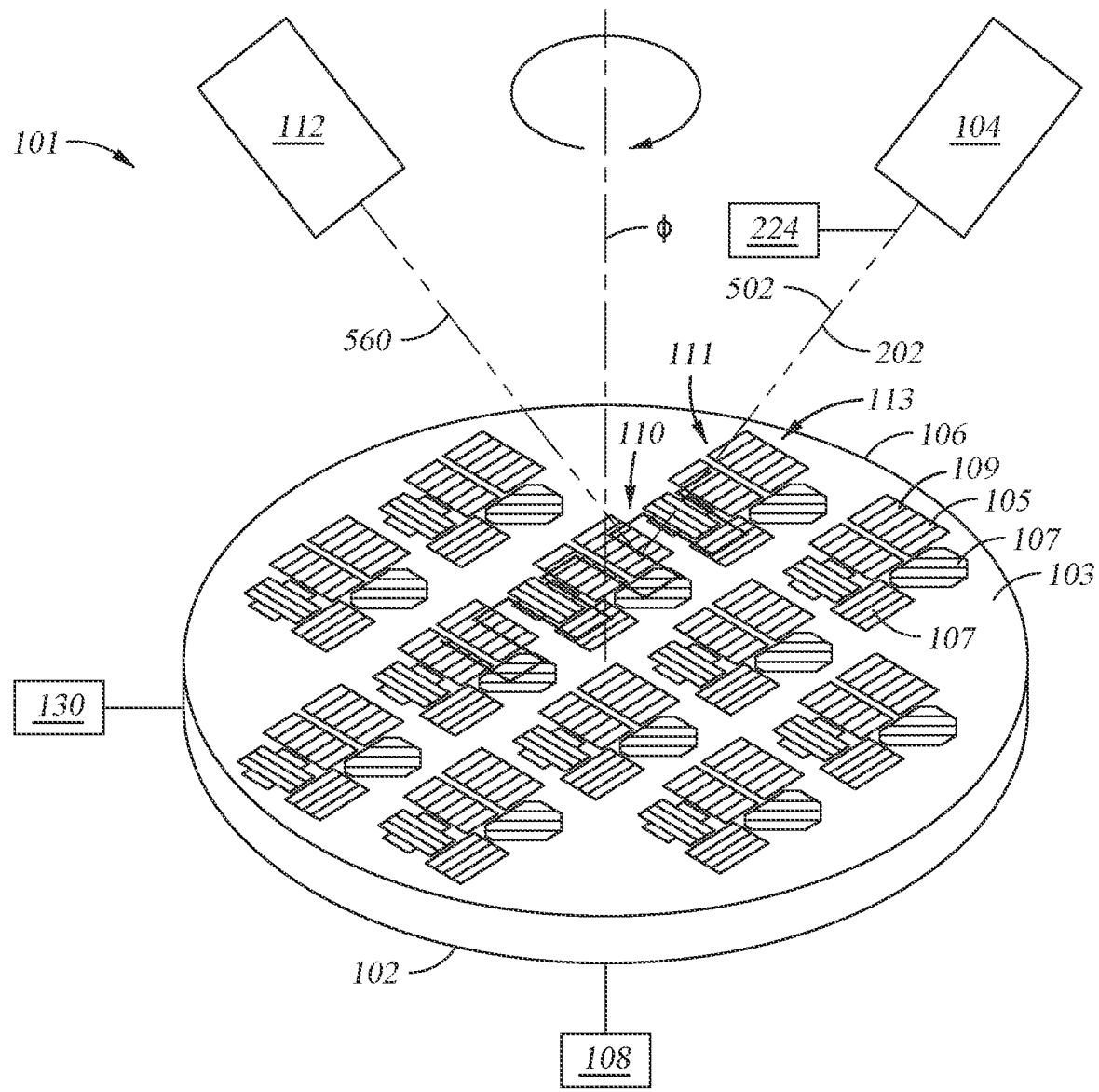
FIG. 1 is a schematic view of a measurement system according to one embodiment.

FIG. 1 is a schematic view of a measurement system 101, according to one embodiment. As shown, the measurement system 101 includes a stage 102 and a measurement arm 104. In some embodiments, a reflection arm 112 is included in the measurement system 101. An arm actuator is configured to rotate the reflection arm 112 about the z-axis and scan the reflection arm 112 in a z-direction. The measurement system 101 is configured to diffract light projected by the measurement arm 104. The light projected by the measurement arm 104 is directed at a substrate 103 disposed over the stage 102. The light beam that is reflected and diffracted from the substrate 103 is incident on the measurement arm 104. The measurement arm 104 is disposed above the stage 102. The reflection arm 112 is disposed above the stage 102.

As shown, the stage 102 includes a support surface 106 and a stage actuator 108. The stage 102 is configured to retain the substrate 103 on the support surface 106. In one embodiment, which can be combined with other embodiments described herein, the substrate 103 is a transparent substrate. The stage 102 is coupled to the stage actuator 108. The stage actuator 108 is configured to move the stage 102 in a scanning path 110 along an x-direction and a y-direction. The stage actuator 108 is also configured to rotate the stage 102 about a z-axis. The stage 102 is configured to move in the scanning path and rotate the substrate 103 such that a light beam projected from the measurement arm 104 is incident on different portions or gratings of the substrate 103 during operation of the measurement system 101.

The substrate 103 includes one or more optical devices 105 having one or more gratings 107 of optical device structures 109. Each of the gratings 107 includes regions of optical device structures 109. Each of optical device structures 109 have an orientation angle $\phi$ and a pitch P (shown in FIG. 2). The pitch P is defined as a distance between adjacent points, such as adjacent first edges or adjacent center of masses of the optical device structures 109. The pitch P and the orientation angle $\phi$ of the optical device structures 109 for a first grating 111 can be different than the pitch P and the orientation angle $\phi$ of the optical device structures 109 for a second grating 113 of the one or more gratings 107. In addition, there can be local pitch P' variations and local orientation angle $\phi'$ variations of the optical devices structures 109 due to local warping or other deformation of the substrate 103. The measurement system 101 can be utilized to measure the pitch P and the orientation angle $\phi$ of the optical device structures 109 for each of the gratings 107 of each of the optical devices 105. The substrate 103 can be a single crystal wafer of any size, such as having a radius from about 150 mm to about 450 mm.

The measurement arm 104 and the stage 102 are in communication with a controller 130. The controller 130 facilitates the control and automation of the method for measuring the pitch P and the orientation angle $\phi$ of optical device structures 109 described herein. The controller may include a central processing unit (CPU) (not shown), memory (not shown), and support circuits (or I/O) (not shown). The CPU may be one of any form of computer processors that are used in industrial settings for controlling various processes and hardware (e.g., motors and other hardware) and monitor the processes (e.g., transfer device position and scan time). The memory (not shown) is connected to the CPU, and may be a readily available memory, such as random access memory (RAM). Software instructions and data can be coded and stored within the memory for instructing the CPU. The support circuits (not shown) are also connected to the CPU for supporting the processor. The support circuits may include cache, power supplies, clock circuits, input/output circuitry, subsystems, and the like. A program (or computer instructions) readable by the controller determines which tasks are performable on the substrate 103. The program may be software readable by the controller and may include code to monitor and control, for example, substrate position and measurement arm position.

Figure 2A:
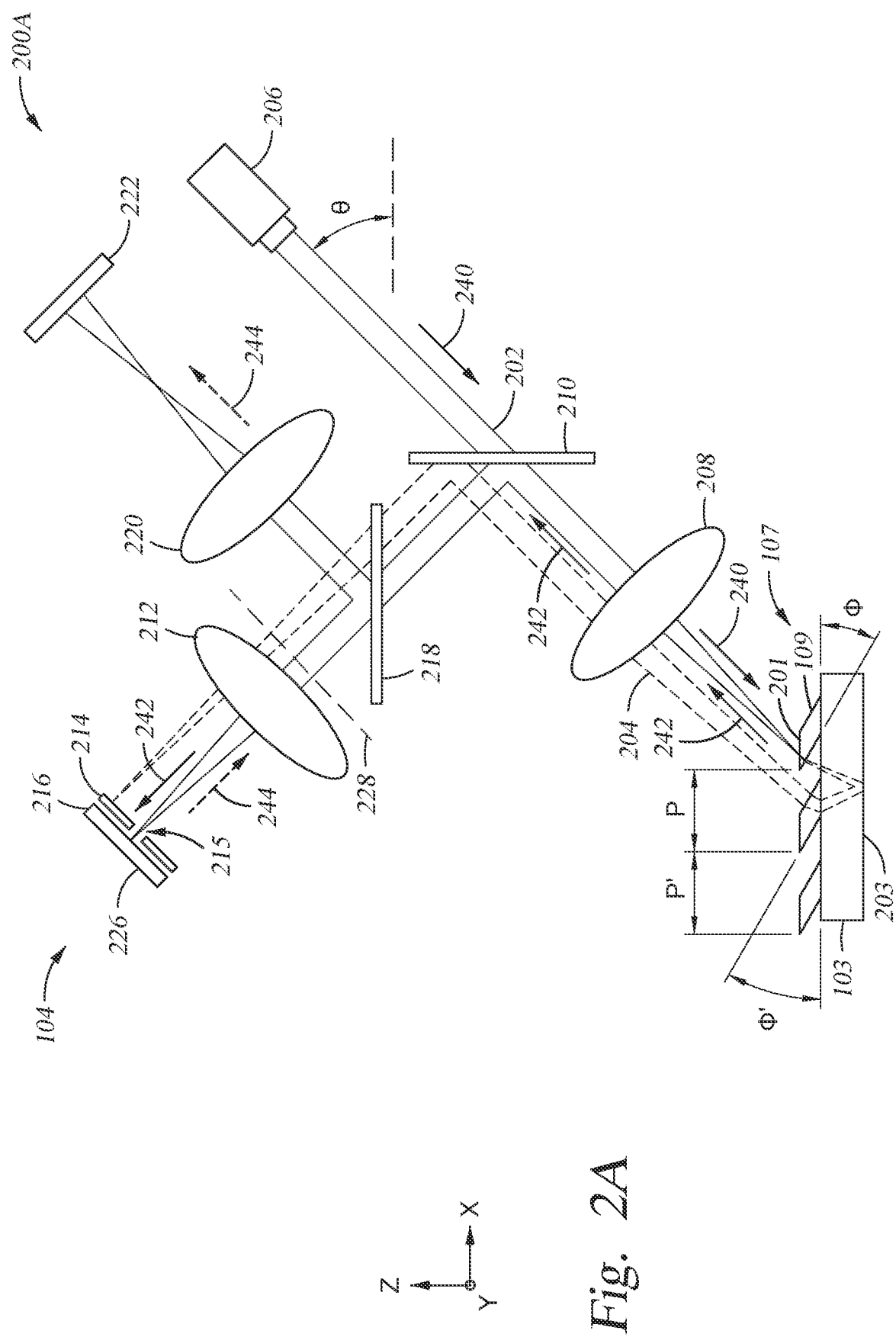
FIG. 2A is a schematic, side-view of a first configuration of a measurement arm according to one embodiment.

FIG. 2A is a schematic, side-view of a first configuration 200A of a measurement arm 104. The measurement arm 104 is configured to direct a light beam 202 to a substrate 103. The measurement arm 104 is configured to measure a pitch P and an orientation angle $\phi$ of optical device structures 109 formed on the substrate 103. The optical device structures 109 form a grating 107. The light beam 202 is projected to a top surface 201 of the optical device structure 109 to be measured. As shown in FIG. 2, the light beam 202 is projected to the plurality of optical device structures 109 of the grating 107.

In embodiments where the substrate 103 is non-opaque (e.g. transparent), which can be combined with other embodiments described herein, multi-reflection beams 204 of light will reflect off of at least a bottom surface 203 of the substrate 103. The multi-reflection beams 204 cause interference when using the measurement arm 104. The interference will induce a non-symmetric image of the light beam 202 e.g., the image of the light path diffracted or reflected off the substrate 103 is not circular or substantially circular, which reduces the accuracy of the measurements of the pitch P and the orientation angle $\phi$. To address this, the measurement system 101 utilizes an aperture filtering component to reduce the interference.

The first configuration 200A of the measurement arm 104 includes a light source 206, a first lens 208, a first beam splitter 210, a second lens 212, an aperture 214, a mirror 216, a second beam splitter 218, a third lens 220, and a detector 222. The measurement arm 104 is in communication with a controller 130 (shown in FIG. 1). The controller 130 is configured to facilitate the operation and movement of the measurement arm 104. The measurement arm 104 may also include an arm actuator 224 (shown in FIG. 1). The arm actuator 224 is configured to rotate the measurement arm 104 about the z-axis and scan the measurement arm in a z-direction. The measurement arm 104 may also be fixed while the measurement is performed.

Figure 3A:
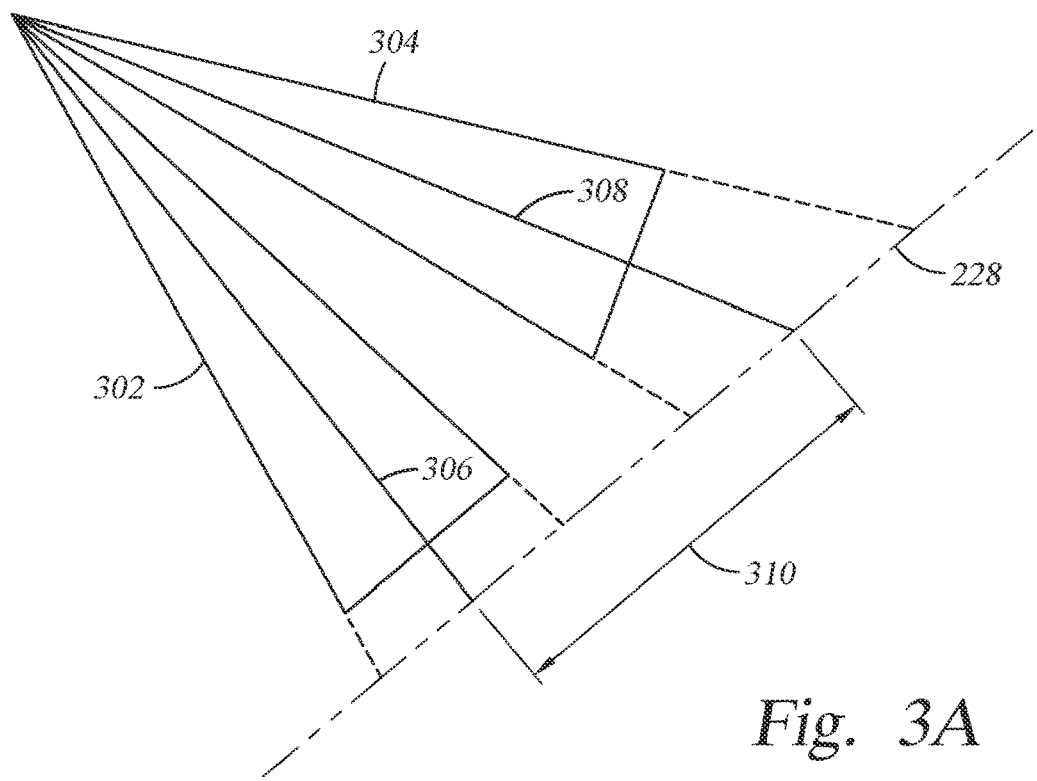
FIG. 3A is a schematic view of a first light beam and a second light beam according to one embodiment.

The light source 206 is configured to project the light beam 202 towards the substrate 103. For example, the light source 206 is an LED or laser. The light source operates in a wavelength range from about 400 nm to about 700 nm. For example, the light source 206 is an LED light source operating at one of 450 nm, 530 nm, or 650 nm. The light beam 202 is projected at a beam angle θ relative to the bottom surface 203 of the substrate 103. In one embodiment, which can be combined with other embodiments described herein, the light beam 202 is a collimated laser beam. In another embodiment, which can be combined with other embodiments described herein, the light beam 202 has a circular or substantially circular cross-section (as shown in FIG. 3A) and/or projection shape. As depicted by first arrows 240, the light beam 202 is projected from the light source 206, transmitted through the first beam splitter 210 (some of the light beam 202 is reflected from the first beam splitter 210), and projected to optical device structure 109 by the first lens 208.

The light source 206 projects the light beam 202 towards the first lens 208. The first lens 208 is a converging lens or focusing lens that focuses the light beam 202. The first lens 208 is adjacent to the substrate 103. The first lens 208 is disposed between the light source 206 and the substrate 103. The first lens 208 is configured to focus the light beam 202 on the top surface 201 of the optical device structure 109 to be measured. The optical device structures 109 cause a phase change of the light beam 202 upon reflection from the optical device structures 109. The first lens 208 is configured to focus the light beam 202 e.g., reduce the beam diameter of the light beam 202, to improve the spatial resolution of the measurement arm 104. Additionally, the improved spatial resolution will better distinguish the light beam 202 from the multi-reflection beams 204.

The light beam 202 is diffracted from the top surface 201 of the optical device structure at the beam angle θ. As depicted by second arrows 242, the light beam 202 is projected through the first lens 208 toward the first beam splitter 210 and to the mirror 216. The first beam splitter 210 reflects the light beam 202 to the second lens 212 (some of the light beam 202 is transmitted through the first beam splitter 210. The first beam splitter 210 is disposed between the first lens 208 and the light source 206. The second lens 212 is disposed between the second beam splitter 218 and the aperture 214. The second lens 212 is a converging lens that focuses the light beam 202.

The second lens 212 focuses the light beam 202 to a reflective surface 226 of the mirror 216. The second lens 212 directs the light beam 202 through the aperture 214. The aperture 214 is disposed in front of the mirror 216. The aperture 214 is positioned such that the light beam 202 is allowed to contact the reflective surface 226 through the aperture 214. The aperture 214 includes an aperture size 215. The aperture size 215 is determined based on a pre-determined spatial resolution of the results. For example, the aperture size 215 is about 50 μm to about 1 mm.

The mirror 216 reflects the light beam 202 to the second beam splitter 218. As depicted by third arrows 244, the light beam reflects from the mirror 216, through the second lens 212, the second beam splitter 218 reflects the light beam 202 to the third lens 220 (some of the light beam 202 is transmitted through the second beam splitter 218), and is projected to the detector 222. The second beam splitter 218 is disposed adjacent to the mirror 216. The third lens 220 is adjacent to the detector 222. The third lens 220 is disposed between the second beam splitter 218 and the detector 222.

The third lens 220 relays an original image at a Fourier plane 228 to the detector 222. The third lens 220 is a relay lens. The third lens 220 can be a single lens or multiple lenses. The Fourier plane 228 is disposed between the second beam splitter 218 and the second lens 212. The original image of the light beam 202 at the Fourier plane 228 is projected to the detector 222. The detector 222 is relayed the original image at the Fourier plane 228 to observe a shift in a chief ray angle (shown in FIGS. 3A and 3B) of the light beam 202 projected to different optical device structures 109. The detector 222 is any optical apparatus used in the art to detect light, such as a charge-coupled device (CCD) array or an active-pixel sensor (CMOS array).

The location of the Fourier plane 228 is defined as the Fourier plane of mirror 216 as well as a plane on the substrate 103. The Fourier plane 228 is the relayed image of the original profile of the light beam 202, as well as the original image relayed to the detector 222. When the pitch changes, the Fourier plane 228 will shift as well as the original image on the detector 222, but the location of the light beam 202 on the substrate 103 and the mirror 216 will not shift.

As the substrate 103 is non-opaque, the multi-reflection beams 204 are formed when the light source 206 projects light that passes through the substrate 103. For example, as shown in FIG. 2A, the multi-reflection beam 204 is diffracted off the bottom surface 203 of the substrate 103. Due to the diffraction off of the bottom surface 203 (and in some embodiments, diffraction off of other optical device structures 109 or the upper surface of the substrate 103), the multi-reflection beams 204 are not projected through the measurement arm 104 along the same path as the light beam 202. For example, as shown in FIG. 2A, the multi-reflection beam 204 is directed to the second lens 212 via the first beam splitter 210. The second lens 212 focuses the multi-reflection beam 204 towards the mirror 216. The second lens 212 is adjacent to the aperture 214. However, the aperture 214 filters out the multi-reflection beam 204 from contacting the mirror 216. The aperture 214 is positioned such that the multi-reflection beams 204 will not contact the reflective surface 226. The multi-reflection beams 204 will have an image point beyond the image point of the light beam 202. The multi-reflection beams 204 will also be shifted from the light beam 202. Therefore, the aperture 214 filters out the multi-reflection beams 204 from being relayed to the detector 222. The precision and accuracy of the original image relayed to the detector 222 will improve without interference from the multi-reflection beams 204.

Figure 2B:
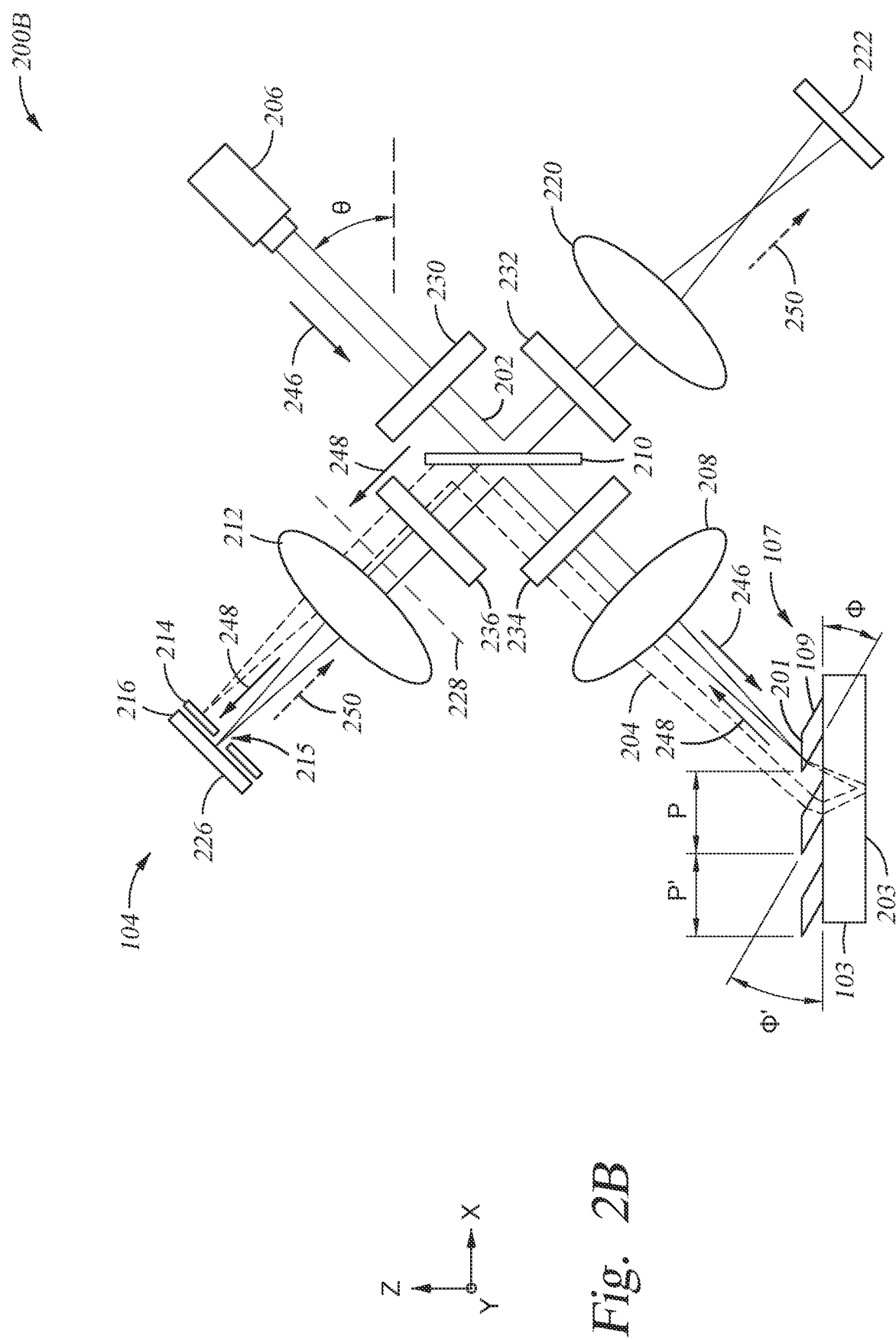
FIG. 2B is a schematic, side-view of a second configuration of a measurement arm according to one embodiment.

FIG. 2B is a schematic, side-view of a second configuration 200B of a measurement arm 104. The second configuration 200B of the measurement arm 104 includes the light source 206, the first lens 208, the first beam splitter 210, the second lens 212, an aperture 214, a mirror 216, the third lens 220, the detector 222, a first linear polarizer 230, a second linear polarizer 232, a first waveplate 234, and a second waveplate 236. The first linear polarizer 230, the second linear polarizer 232, the first waveplate 234, and the second waveplate 236 are configured to increase the efficiency of the light beams in the measurement arm 104 and reduce the light beams reflected between components of the measurement arm 104. The first linear polarizer 230, the second linear polarizer 232, the first waveplate 234, and the second waveplate 236 may be interchangeable to accommodate for pre-determined wavelengths. For example, the first waveplate 234, and the second waveplate 236 may be quarter waveplates. The second configuration 200B allows for a compact design compared to the first configuration 200A. However, the first linear polarizer 230, the second linear polarizer 232, the first waveplate 234, and the second waveplate 236 are included to avoid undesired light beam diffraction and reflection within the measurement arm 104.

The light source 206 is configured to project the light beam 202 towards the substrate 103. The light beam 202 is projected at a beam angle θ relative to the bottom surface 203 of the substrate 103. In one embodiment, which can be combined with other embodiments described herein, the light beam 202 is a collimated laser beam. In another embodiment, which can be combined with other embodiments described herein, the light beam 202 has a circular or substantially circular cross-section (as shown in FIG. 3A) and/or projection shape. As depicted by first arrows 246, the light beam 202 is projected from the light source 206 to the first linear polarizer 230, transmitted through the first beam splitter 210 (some of the light beam 202 is reflected from the first beam splitter 210), through the first waveplate 234, and projected to optical device structure 109 by the first lens 208. The first beam splitter 210 is a polarized beam splitter. The first linear polarizer 230, the second linear polarizer 232, the first waveplate 234, and the second waveplate 236 maximize the efficiency of the light beam 202 transmitted to the substrate 103 such that the light beam 202 remains along the path defined by the first arrows 246. The first linear polarizer 230 is disposed between the light source 206 and the first beam splitter 210. The first waveplate 234 is disposed between the first beam splitter 210 and the first lens 208. The first beam splitter 210 will let a polarized light beam be transmitted and reflect another polarization light beam. The first linear polarizer 230, the second linear polarizer 232, the first waveplate 234, and the second waveplate 236 changes the polarization of the light beam 202 before contacting the first beam splitter 210 in order to control whether the light beam 202 is reflected or transmitted by the first beam splitter 210.

The light source 206 projects the light beam 202 towards the first lens 208. The first lens 208 is a converging lens that focuses the light beam 202. The first lens 208 is adjacent to the substrate 103. The light beam 202 is projected from the first linear polarizer 230 to the first lens 208. The first lens 208 is configured to focus the light beam 202 on the top surface 201 of the optical device structure 109 to be measured. The first lens 208 is configured to focus the light beam 202 e.g., reduce the beam diameter of the light beam 202, to improve the spatial resolution of the measurement arm 104. Additionally, the improved spatial resolution will better distinguish the light beam 202 from the multi-reflection beams 204. The optical device structures 109 cause a phase change of the light beam 202 upon reflection from the optical device structures 109. The first lens 208 is disposed between the first waveplate 234 and the substrate 103.

The light beam 202 is diffracted from the top surface 201 at the beam angle θ. As depicted by second arrows 248, the light beam 202 is projected through the first lens 208 toward the first beam splitter 210 and to the mirror 216. Upon reflection, the light beam 202 passes through the first lens 208 and the first waveplate 234 prior to contacting the first beam splitter 210. The first beam splitter 210 reflects the light beam 202 to the second waveplate 236, through the second lens 212, and to the mirror 216. The second waveplate 236 is disposed between second lens 212 and the first beam splitter 210. The first linear polarizer 230, the second linear polarizer 232, the first waveplate 234, and the second waveplate 236 maximize the efficiency of the light beam 202 reflected to the mirror 216 such that the light beam 202 remains along the path defined by the second arrows 248.

The second lens 212 is disposed between the second waveplate 236 and the aperture 214. The first beam splitter 210 is disposed between the first linear polarizer 230, the second linear polarizer 232, the first waveplate 234, and the second waveplate 236. The distance between the first lens 208 and the second lens 212 is defined by the sum of each respective focal length. The second lens 212 focuses the light beam 202 to a reflective surface 226 of the mirror 216. The second lens 212 directs the light beam 202 through the aperture 214. The aperture 214 is disposed in front of the mirror 216. The aperture 214 is positioned such that the light beam 202 is allowed to contact the reflective surface 226. The aperture 214 includes the aperture size 215.

The mirror 216 reflects the light beam 202 to the detector 222. As depicted by third arrows 250, the light beam reflects from the mirror 216, through the second lens 212, through the second waveplate 236, the first beam splitter 210 transmits the light beam 202 (some of the light beam 202 is transmitted through the second beam splitter 218) to the second linear polarizer 232 and the third lens 220, and is projected to the detector 222. The second linear polarizer is disposed between the first beam splitter 210 and the third lens 220. The first linear polarizer 230, the second linear polarizer 232, the first waveplate 234, and the second waveplate 236 maximize the efficiency of the light beam 202 transmitted to the detector 222 such that the light beam 202 remains along the path defined by the third arrows 250.

The third lens 220 relays an original image at a Fourier plane 228 to the detector 222. The third lens 220 is adjacent to the detector 222. The third lens 220 is disposed between the second linear polarizer 232 and the detector 222. The original image of the light beam 202 at the Fourier plane 228 is projected to the detector 222. The detector 222 is any optical apparatus used in the art to detect light, such as a charge-coupled device (CCD) array or an active-pixel sensor (CMOS array).

As the substrate 103 is non-opaque, the multi-reflection beams 204 are formed when the light source 206 projects light that passes through the substrate 103. For example, as shown in FIG. 2B, the multi-reflection beam 204 is diffracted off the bottom surface 203 of the substrate 103. Due to the diffraction off of the bottom surface 203 (and in some embodiments, diffraction off of other optical device structures 109), the multi-reflection beams 204 are not projected through the measurement arm 104 along the same path as the light beam 202. For example, as shown in FIG. 2B, the multi-reflection beam 204 is directed to the second lens 212 via the first beam splitter 210. The second lens 212 focuses the multi-reflection beam 204 towards the mirror 216. The second lens 212 is adjacent to the aperture 214. However, the aperture 214 filters out the multi-reflection beam 204 from contacting the mirror 216. The aperture 214 is positioned such that the multi-reflection beams 204 will not contact the reflective surface 226. The multi-reflection beams 204 will have an image point beyond the image point of the light beam 202. The multi-reflection beams 204 will also be shifted from the light beam 202. Therefore, the aperture 214 filters out the multi-reflection beams 204 from being relayed to the detector 222. The precision and accuracy of the original image relayed to the detector 222 will improve without interference from the multi-reflection beams 204.

FIG. 3A is a schematic view of a first light beam 302 and a second light beam 304. In one example, the first light beam 302 and the second light beam 304 correspond to the light beam 202 shown in FIGS. 2A and 2B. In another example, the first light beam 302 and the second light beam 304 correspond to the light beam 502 shown in FIGS. 5A-5G. To facilitate explanation, FIG. 3A is described with reference to FIGS. 2A and 2B.

The first light beam 302 corresponds to the light beam 202 projected to a first optical device structure (e.g., the optical device structures 109 shown in FIGS. 2A and 2B). The first light beam 302 is projected by the measurement arm 104 to measure the pitch P and the orientation angle ϕ of the first optical device structure. The second light beam 304 corresponds to the light beam 202 projected to a second optical device structure (e.g., the optical device structures 109 shown in FIGS. 2A and 2B). The second light beam 304 is projected by the measurement arm 104 to measure the pitch P and the orientation angle ϕ of the second optical device structure.

As shown in FIG. 3A, the first light beam 302 includes a first chief ray angle (CRA) 306 defined as the center line of the first light beam 302. The second light beam 304 includes a second CRA 308 defined as the center line of the second light beam 304. As discussed with reference to FIGS. 2A and 2B, the original image at a Fourier plane 228 is relayed to a detector 222 in a measurement arm 104 of a measurement system 101. The detector 222 is configured to detect a shift 310 between the positon of the first CRA 306 and the second CRA 308 on the Fourier plane 228. The shift 310 corresponds to a change in pitch P and orientation angle ϕ between the first optical device structure and the second optical device structure.

Figure 3B:
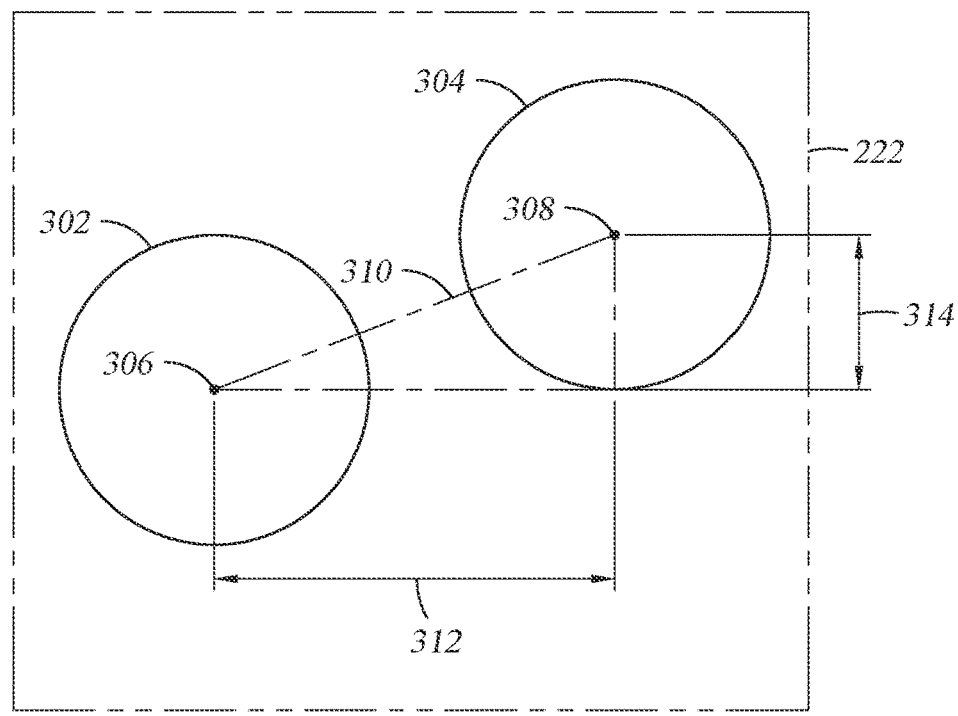
FIG. 3B is a schematic, top-view of a detector according to one embodiment.

FIG. 3B is a schematic, top-view of a detector 222. To facilitate explanation, FIG. 3B is described with reference to FIGS. 2A and 2B, however it is contemplated that a first detector 522 and a second detector 534 are also shown in FIG. 3B. The detector 222 includes the first light beam 302 and the second light beam 304. The first light beam 302 and the second light beam 304 are relayed from the Fourier plane 228 to the detector 222 by the third lens 220 (shown in FIGS. 2A and 2B). The shift 310 between the first CRA 306 and the second CRA 308 correspond to a change in pitch, for example, a change from the pitch P to the pitch P' (shown in FIGS. 2A and 2B), and a change in orientation angle ϕ, for example, a change from the orientation angle ϕ to the orientation angle ϕ' (shown in FIGS. 2A and 2B). The detector 222 only includes the first light beam 302 and the second light beam 304. As the aperture 214, shown in FIGS. 2A and 2B, filters the multi-reflection beams 204, the detector 222 is able to detect the first light beam 302 and the second light beam 304 without interference. Decreasing the interference with the aperture 214 increases precision, accuracy, and reliability when determining the pitch P and the orientation angle ϕ.

The shift 310 has an x component 312 and a y component 314. In one embodiment, which can be combined with other embodiments described herein, the x component 312 corresponds to a change in pitch and the y component corresponds to a change in orientation angle ϕ. In another embodiment, which can be combined with other embodiments described herein, the x component 312 corresponds to a change in orientation angle ϕ and the y component corresponds to a change in pitch. The pitch direction and orientation direction can be pre-calibrated by adjusting the measurement arms 104 and the stage 102. The shift 310 is decomposed into the pre-defined pitch direction and orientation direction. The pitch and the orientation angle ϕ are at least partially determined with a software algorithm executed by a controller 130 in communication with the measurement system 101. Utilizing the measurement system 101 will allow for the formation of a high-resolution map of the pitch P and the orientation angle ϕ in a two-dimensional area of the substrate 103.

Figure 4:
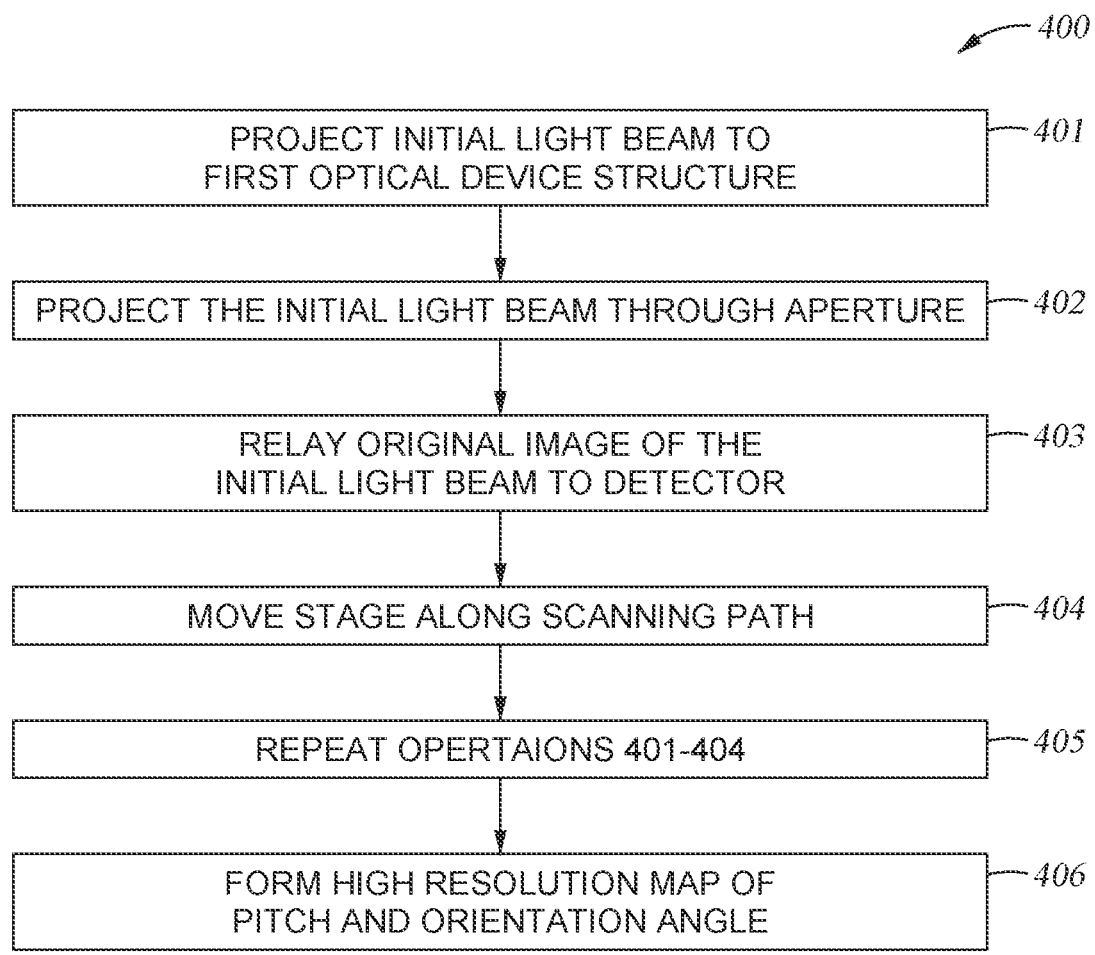
FIG. 4 is a flow diagram of a method of determining a change in pitch P and a change in an orientation angle φ with a measurement system, according to embodiments described herein.

FIG. 4 is a flow diagram of a method 400 of determining a change in pitch P and a change in an orientation angle ϕ with a measurement system 101. In one example, the method 400 may be executed by a first configuration 200A or a second configuration 200B of the measurement system 101. In another example, the method 400 may be executed by the configurations 500A-500G of the measurement system 101 shown in FIGS. 5A-5G below. To facilitate explanation, the method 400 will be described with reference to the first configuration 200A of the measurement system 101. A controller 130 is operable to facilitate the operations of the method 400.

At operation 401, a light beam 202 is projected to a first optical device structure. The light beam 202 is projected from a light source 206 to a top surface 201 of the first optical device structure. The light beam 202 diffracts off the top surface 201 of the first optical device structure.

At operation 402, the light beam 202 is projected through an aperture 214. A mirror 216 is disposed behind the aperture 214. The light beam is operable to be projected through the aperture 214. The image point of the light beam 202 is located on a reflective surface 226 of the mirror 216. The aperture 214 is positioned such that the light beam 202 is allowed to contact the reflective surface 226. The aperture 214 filters out multi-reflection beams 204 from contacting the mirror 216. The aperture 214 is positioned such that the multi-reflection beams 204 will not contact the reflective surface 226. Filtering the multi-reflection beams 204 will allow for improved precision, accuracy, and reliability in measurement of an original image to be relayed to a detector 222.

At operation 403, an original image of the light beam 202 is relayed to a detector 222. The mirror 216 reflects the light beam 202 to the detector 222 via a second beam splitter 218. A third lens 220 relays the original image at a Fourier plane 228. The light beam 202 includes the first CRA 306 (shown in FIGS. 3A and 3B) that is relayed to the detector 222 in the original image. Additionally, the original image is recorded from the detector 222. The original image is saved to the controller 130.

At operation 404, a stage 102 is moved along a scanning path 110 (shown in FIG. 1). The stage 102 is moved such that the measurement arm 104 is disposed such that the light beam 202 may be projected to a second optical device structure.

At operation 405, operations 401-404 are repeated for at least a second optical device structure. The operations 401-404 are repeated until the original image of a pre-determined number of optical device structures have been obtained by the detector 222.

At operation 406, a high resolution map of the pitch P and the orientation angle ϕ is formed. The high resolution map has improved accuracy, precision, and reliability due to the aperture 214 filtering out the interference from the multi-reflection beams 204. Additionally, the controller 130 will apply algorithms to the original images and generate the high resolution map of the pitch P and orientation angle 4).

Figure 5A:
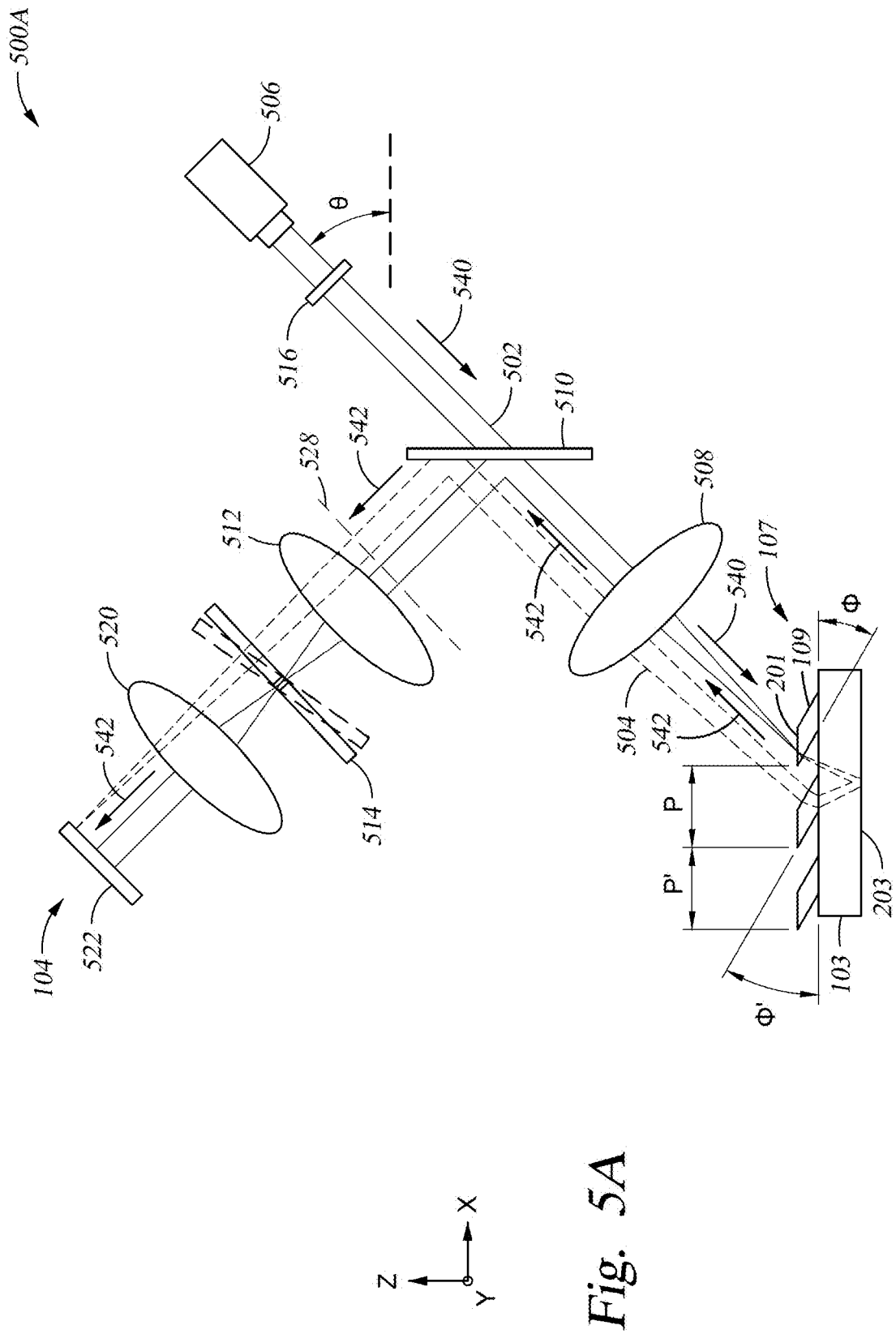
FIGS. 5A-5F are schematic, side-view of configurations of a measurement arm according to one embodiment.

FIG. 5A is a schematic, side-view of a third configuration 500A of a measurement arm 104. The measurement arm 104 is configured to direct a light beam 502 to a substrate 103. The measurement arm 104 is configured to measure a pitch P and an orientation angle ϕ of optical device structures 109 formed on the substrate 103. The optical device structures 109 form a grating 107. The light beam 502 is projected to a top surface 201 of the optical device structure 109 to be measured. As shown in FIG. 5, the light beam 502 is projected to the plurality of optical device structures 109 of the grating 107. In embodiments where the substrate 103 is non-opaque (e.g. transparent), which can be combined with other embodiments described herein, multi-reflection beams 504 of light will reflect off of at least a bottom surface 203 of the substrate 103. The multi-reflection beams 504 cause interference when using the measurement arm 104. To address this, the measurement system 101 utilizes an aperture filtering component to reduce the interference.

The third configuration 500A of the measurement arm 104 includes a light source 506, a first lens 508, a first beam splitter 510, a second lens 512, an aperture 514, a reticle 516, a third lens 520, and the first detector 522.

The light source 506 is configured to project the light beam 502 towards the substrate 103. The light source 506 operates in a wavelength range from about 250 nm to about 530 nm. The light beam 502 is projected at a beam angle θ relative to the bottom surface 203 of the substrate 103. In one embodiment, which can be combined with other embodiments described herein, the light beam 502 is a collimated laser beam. As depicted by first arrows 540, the light beam 502 is projected from the light source 506, transmitted through the first beam splitter 510 (some of the light beam 502 is reflected from the first beam splitter 510), and projected to optical device structure 109 by the first lens 508. The reticle 516 is disposed between the first beam splitter 510 and the light source 506. The reticle 516 includes a marker thereon. The marker may be a cross, circular, triangular, or other suitable shape. The reticle 516 may adjust the light beam 502 to project the marker to the substrate 103. The marker will help localize the center of the light beam 502 and will allow for easier tracking on the first detector 522 for improved measurement performance.

The light source 506 projects the light beam 502 towards the first lens 508. The first lens 508 is a converging lens that focuses the light beam 502. The first lens 508 is adjacent to the substrate 103. The first lens 508 is disposed between the light source 506 and the substrate 103. The first lens 508 is configured to focus the light beam 502 on the top surface 201 of the optical device structure 109 to be measured. An original image of the top surface 201 of the optical device to be measured will be related to the first detector 522. The optical device structures 109 cause a phase change of the light beam 502 upon reflection from the optical device structures 109. The first lens 508 is configured to focus the light beam 502 e.g., reduce the beam diameter of the light beam 502, to improve the spatial resolution of the measurement arm 104. Additionally, the improved spatial resolution better distinguishes the light beam 502 from the multi-reflection beams 504.

The light beam 502 is diffracted from the top surface 201 of the optical device structure at the beam angle θ. As depicted by second arrows 542, the light beam 502 is projected through the first lens 508 toward the first beam splitter 510 and to the mirror 216. The first beam splitter 510 reflects the light beam 502 to the second lens 512 (some of the light beam 502 is transmitted through the first beam splitter 510, for example 50% of the light beam 502 is transmitted. The first beam splitter 510 is disposed between the first lens 508 and the light source 506. The second lens 512 is disposed between the first beam splitter 510 and the aperture 514. The second lens 512 is a converging lens that focuses the light beam 502.

The second lens 512 focuses the light beam 502 through the aperture 514. The aperture 514 is disposed between the second lens 512 and the third lens 520. The aperture 514 is positioned such that the light beam 502 is allowed to pass through the aperture 514. In one embodiment, which can be combined with other embodiments described herein, the aperture 514 may be perpendicular to the direction of projection of the light beam 502 (e.g., perpendicular to the second arrows 542). In another embodiment, which can be combined with other embodiments described herein, the aperture 514 may be at an aperture angle relative to the direction of projection of the light beam 502 (e.g., non-perpendicular relative to the second arrows 542).

The aperture 514 shown in phantom in FIG. 5A is at an aperture angle. The aperture angle may be pre-determined based on the beam angle θ. The aperture angle of the aperture 514 improves the alignment of the aperture 514 relative to the top surface 201 of the optical device structures 109. The pre-determined aperture angle will ensure that the aperture 514 allows the original image focused on the top surface 201 of the optical device structure 109 to pass therethrough and better blocks the light beam 502 from undesired region of the top surface 201 of the optical device structures 109. An aperture position of the aperture 514 may then be determined. The aperture position is chosen to ensure that the original image to be captured is aligned in the X-Y plane on the substrate 103. The aperture position is also adjusted to ensure that the marker is projected through the aperture 514 to the first detector 522.

The third lens 520 is adjacent to the first detector 522. The third lens 520 is disposed between the aperture 514 and the first detector 522. The third lens 520 relays an original image at a Fourier plane 528 to the first detector 522. The third lens 520 can be a single lens or multiple lenses. The Fourier plane 528 is disposed between the first beam splitter 510 and the second lens 512. The original image of the light beam 502 at the Fourier plane 528 is projected to the first detector 522. The first detector 522 is relayed the original image at the Fourier plane 528 to observe a shift in a chief ray angle (shown in FIGS. 3A and 3B) of the light beam 502 projected to different optical device structures 109.

The aperture 514 filters out the multi-reflection beam 504 from contacting the first detector 522. The multi-reflection beams 504 will have an image point beyond or before the image point of the light beam 502. The multi-reflection beams 504 will also be shifted from the light beam 502. Therefore, the aperture 514 filters out the multi-reflection beams 504 from being relayed to the first detector 522. The precision and accuracy of the original image relayed to the first detector 522 improves without interference from the multi-reflection beams 504.

Figure 5B:
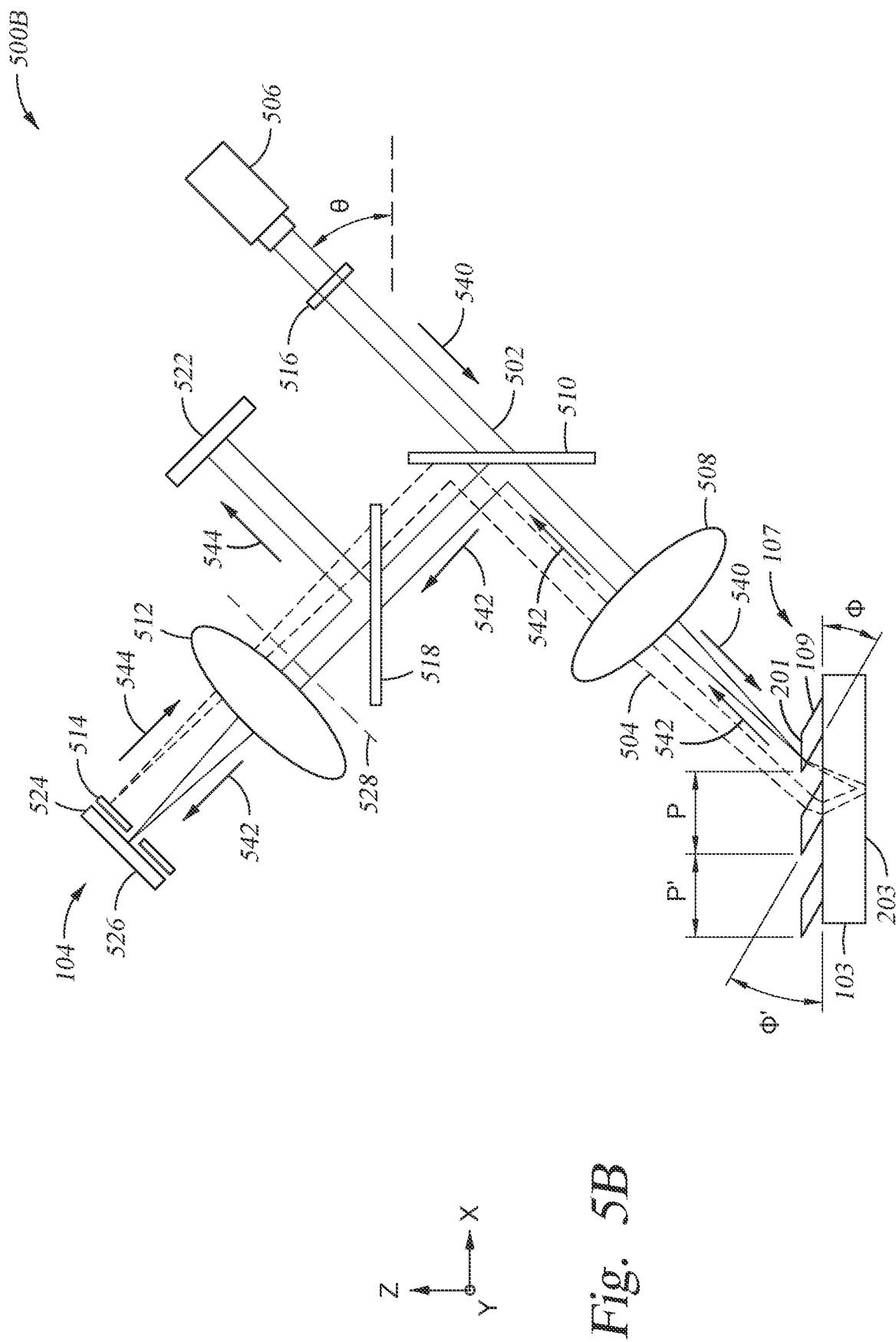

FIG. 5B is a schematic, side-view of a fourth configuration 500B of a measurement arm 104. The fourth configuration 500B of the measurement arm 104 is similar to the third configuration 500A. However, in the fourth configuration 500B, the light beam 502 contacting the first beam splitter 510 after being incident on the on the top surface 201 of the optical device structure 109 is directed to a mirror 524. The light beam 502 is directed to the mirror 524 via a second lens 512.

The second lens 512 focuses the light beam 502 to a reflective surface 526 of the mirror 524. The second lens 512 directs the light beam 502 through the aperture 514. The aperture 514 is disposed in front of the mirror 524. The aperture 514 is positioned such that the light beam 502 is allowed to contact the reflective surface 526 through the aperture 514.

The mirror 524 reflects the light beam 502 to a second beam splitter 518. As depicted by third arrows 544, the light beam 502 reflects from the mirror 524, through the second lens 512, the second beam splitter 518 reflects the light beam 202 to the first detector 522 (some of the light beam 502 is transmitted through the second beam splitter 518).

In the fourth configuration 500B, the first lens 508 is utilized for projecting and collecting the light beam 502. The top surface of the first lens 508 will reflect the light beam 502 into the path indicated by second arrows 542. This portion of the light beam 502 does not go through the substrate 103 but was collected by the first detector 522.

Figure 5C:
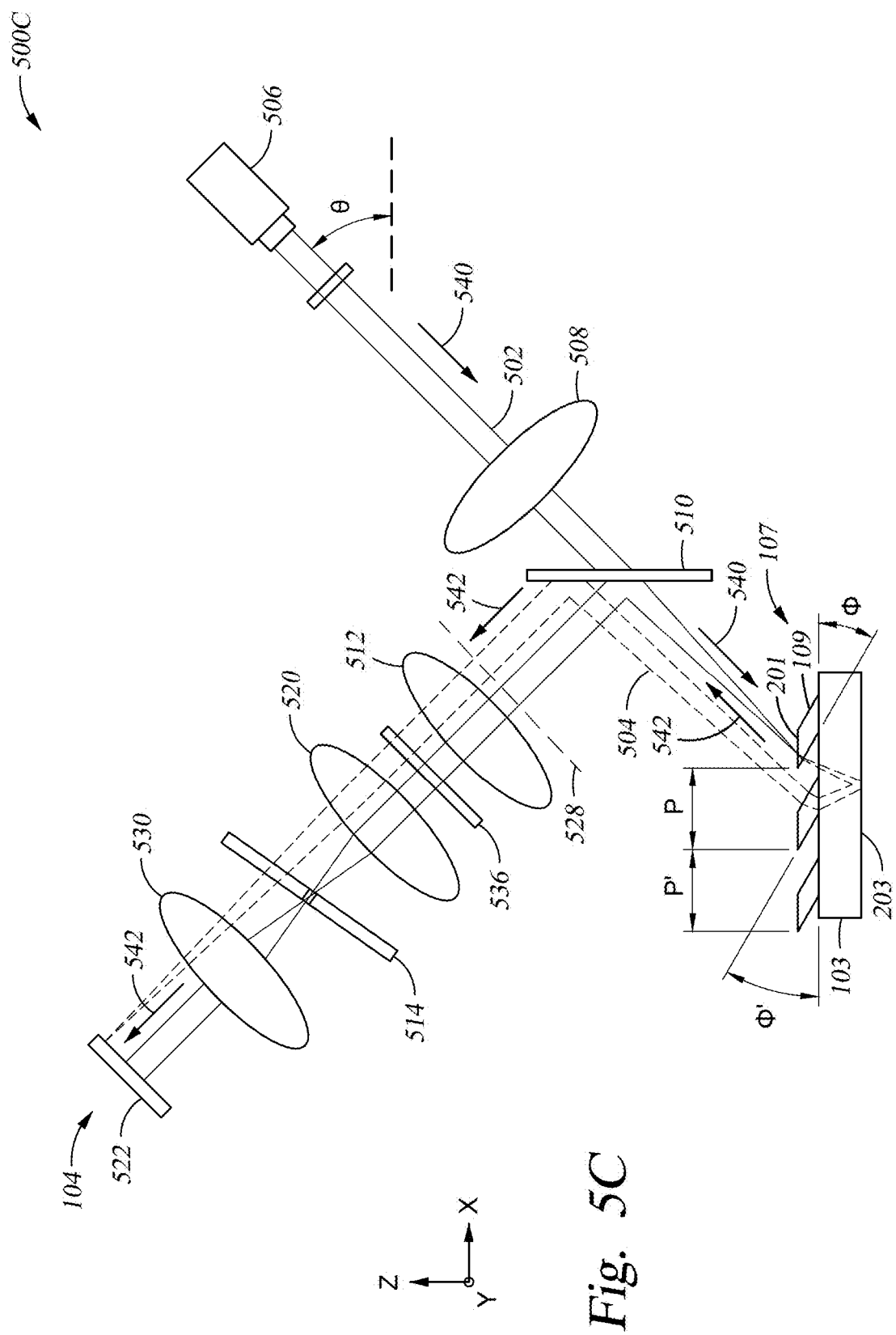

FIG. 5C is a schematic, side-view of a fifth configuration 500C of a measurement arm 104. The fifth configuration 500C of the measurement arm 104 includes all of the elements described above regarding the third configuration 500A. However, the fifth configuration 500C includes the first lens 508 disposed between the first beam splitter 510 and the reticle 516. The fifth configuration 500C further includes a fourth lens 530. The fourth lens 530 is disposed between the aperture 514 and the first detector 522. The fourth lens 530 is configured to collect the light beam 502. The fifth configuration 500C allows for the minimization of back-reflection from the first lens 508 back into the light beam 502. Therefore, a signal to noise ratio is improved. The distance from the reticle 516 to the first lens 508 is equal to the focal length of the first lens 508. In the fifth configuration 500C, the first lens 508 (projecting lens) and the second lens 512 (collecting lens) are split, so the reflection from a top surface of the first lens 508 will not travel to the first detector 522. Therefore, back-reflection is reduced.

Figure 5D:
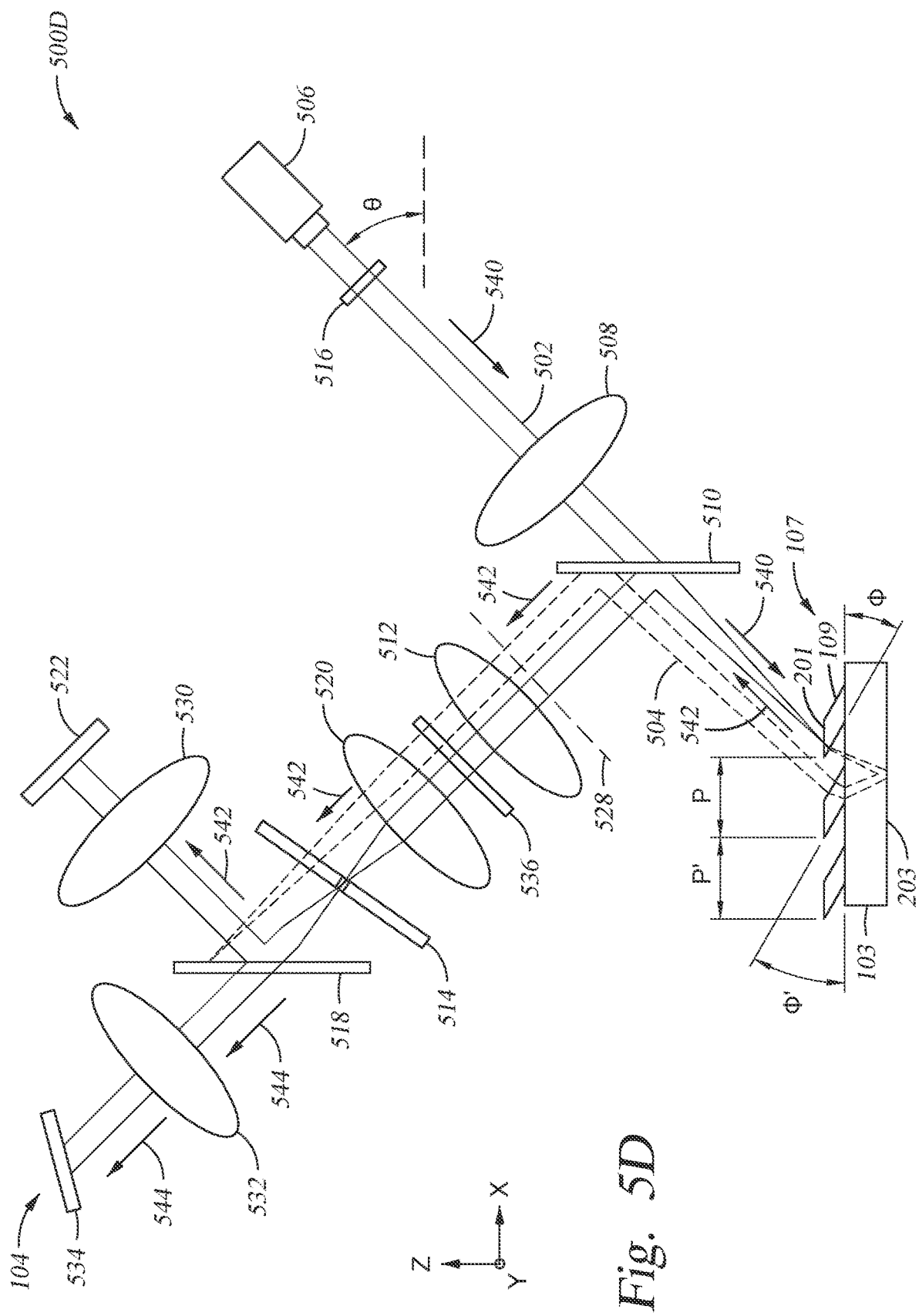

FIG. 5D is a schematic, side-view of a sixth configuration 500D of the measurement arm 104. The sixth configuration 500D of the measurement arm 104 includes all of the elements described above regarding the fifth configuration 500C in addition to a second beam splitter 518, a fifth lens 532, and a second detector 534. The second beam splitter 518 is disposed between the aperture 514 and the fifth lens 532.

The fifth lens 532 is disposed between the second beam splitter 518 and the second detector 534. The light beam 502 passes through the aperture 514 and is incident on the second beam splitter 518 (as indicated by second arrows 542). The second beam splitter 518 reflects the light beam 502 to the fourth lens 530 (some of the light beam 502 is transmitted through the second beam splitter 518, for example 50% of the light beam 502 is transmitted, as indicated by third arrows 544). The light beam 502 that is transmitted through the second beam splitter 518 is directed to the fifth lens 532. The fifth lens 532 directs the light beam 502 to the second detector 534. The second detector 534 is disposed at an angle relative to the direction of projection of the light beam 502 (e.g., angled relative to the third arrows 544).

Inclusion of the second detector 534 allows for monitoring the substrate 103 and alignment of the aperture 514. In particular, the configuration facilitates monitoring of the aperture location as well as monitoring of how the light beam 502 is focused on the top surface 201 of the optical device structure 109. The fifth lens 532 relays the original image to the second detector 534 to ensure that the top surface 201 of the optical device structure 109 and the aperture 514 are aligned as pre-determined. As such, the second detector 534 is used to monitor the focus change through the scanning of the substrate 103.

Figure 5E:
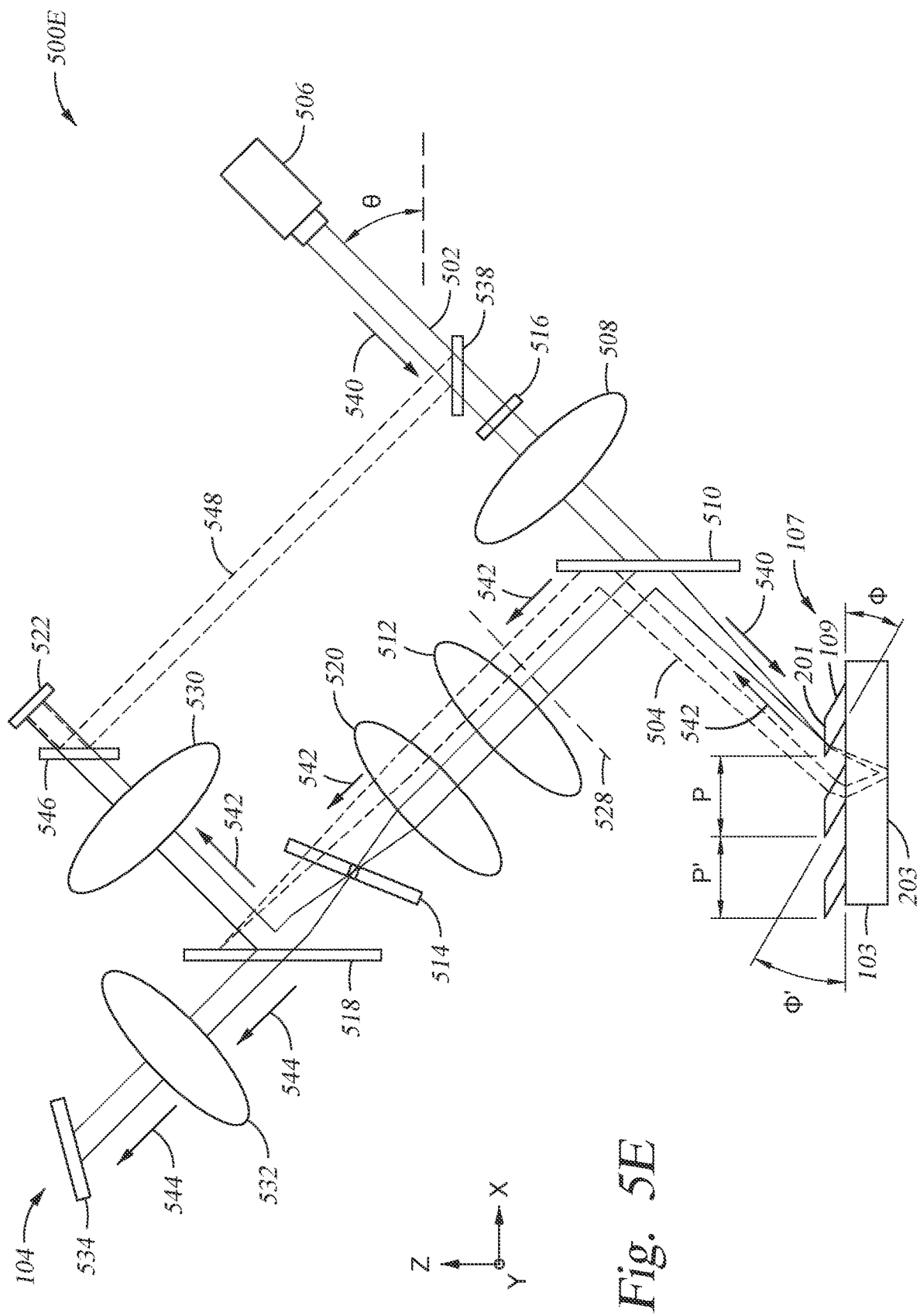

FIG. 5E is a schematic, side-view of a seventh configuration 500E of measurement arm 104. The seventh configuration 500E of the measurement arm 104 includes all of the elements described above regarding the sixth configuration 500D in addition to a third beam splitter 538 and a fourth beam splitter 546. The third beam splitter 538 is disposed between the light source 506 and the reticle 516. The fourth beam splitter 546 is disposed between the first detector 522 and the fourth lens 530. The light beam 502 is projected from the light source 506 and is incident on the third beam splitter 538. The third beam splitter 538 reflects the light beam 502 to form a reference beam 548. Some of the light beam 502 is transmitted through the third beam splitter 538 to the reticle 516. The seventh configuration 500E includes the aperture 514, which is at an aperture angle.

The reference beam 548 is included to generate an interferogram between the light beam 502 and the reference beam 548 directly from the light source 506. The interferogram will be displayed on the first detector 522, which will have improved contrast to better locate the marker of the reticle 516. Without the reference beam 548, the marker on the first detector 522 will be blurred, which limits the sharpness of the original image and the accuracy of the system. Generating interference fringes on the second detector 534 will help locate the marker more accurately.

Figure 5F:
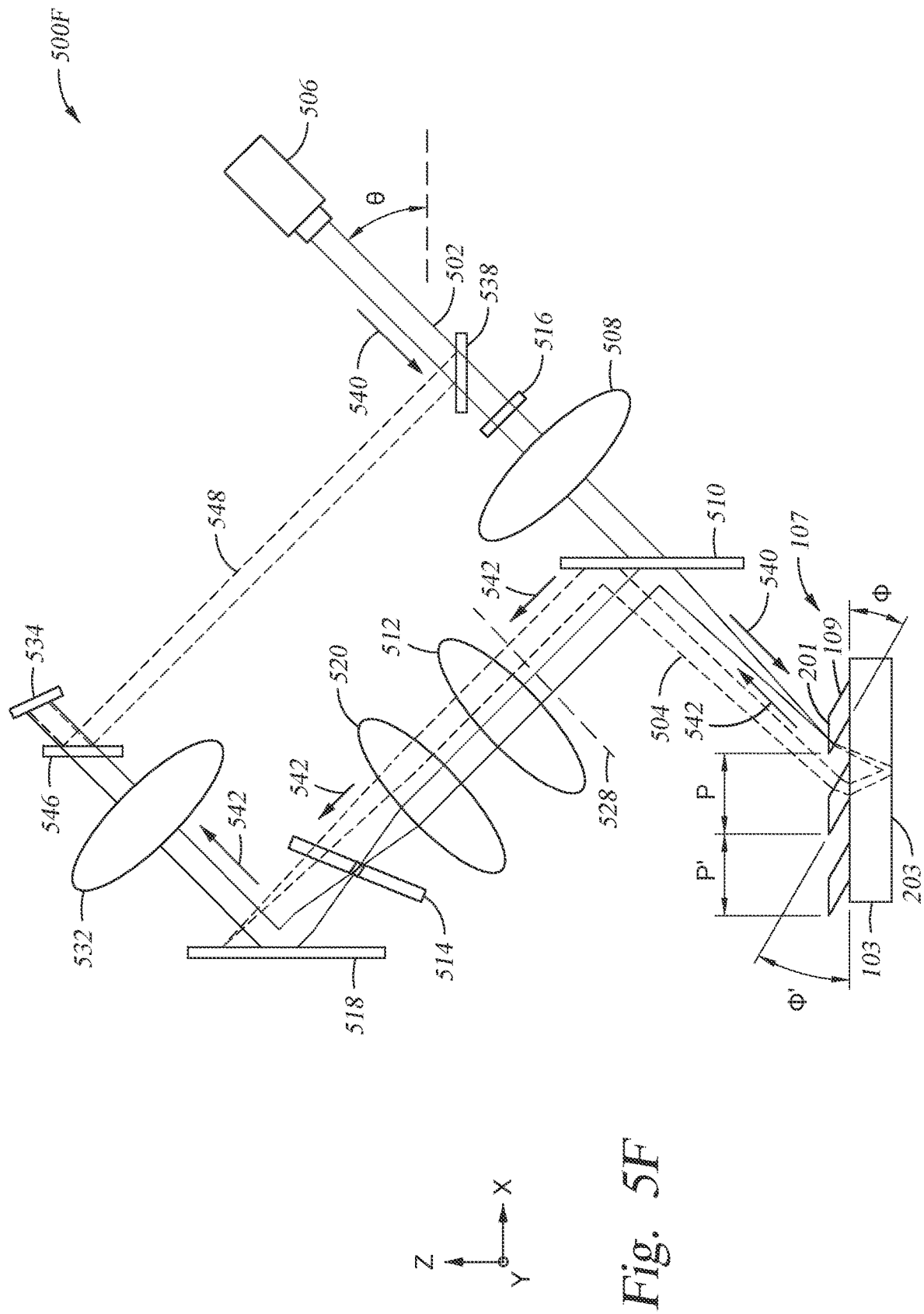

FIG. 5F is a schematic, side-view of an eighth configuration 500F of measurement arm 104. The eighth configuration 500F of the measurement arm 104 includes all of the elements described above regarding the seventh configuration 500E however, the first detector 522 and the fourth lens 530 are removed. As opposed to the seventh configuration, the second beam splitter 518 reflects the light beam 502 to the fifth lens 532. The fifth lens 532 relays the light beam 502 to the second detector 534. The second detector 534 is disposed at an angle relative to the direction of projection of the light beam 502 (e.g., angled relative to the second arrows 542). The reference beam 548 will display the interferogram on the second detector 534. The spacing and the orientation of the fringes indicates the pitch/orientation of the optical device structure 109 on the substrate 103.

Figure 5G:
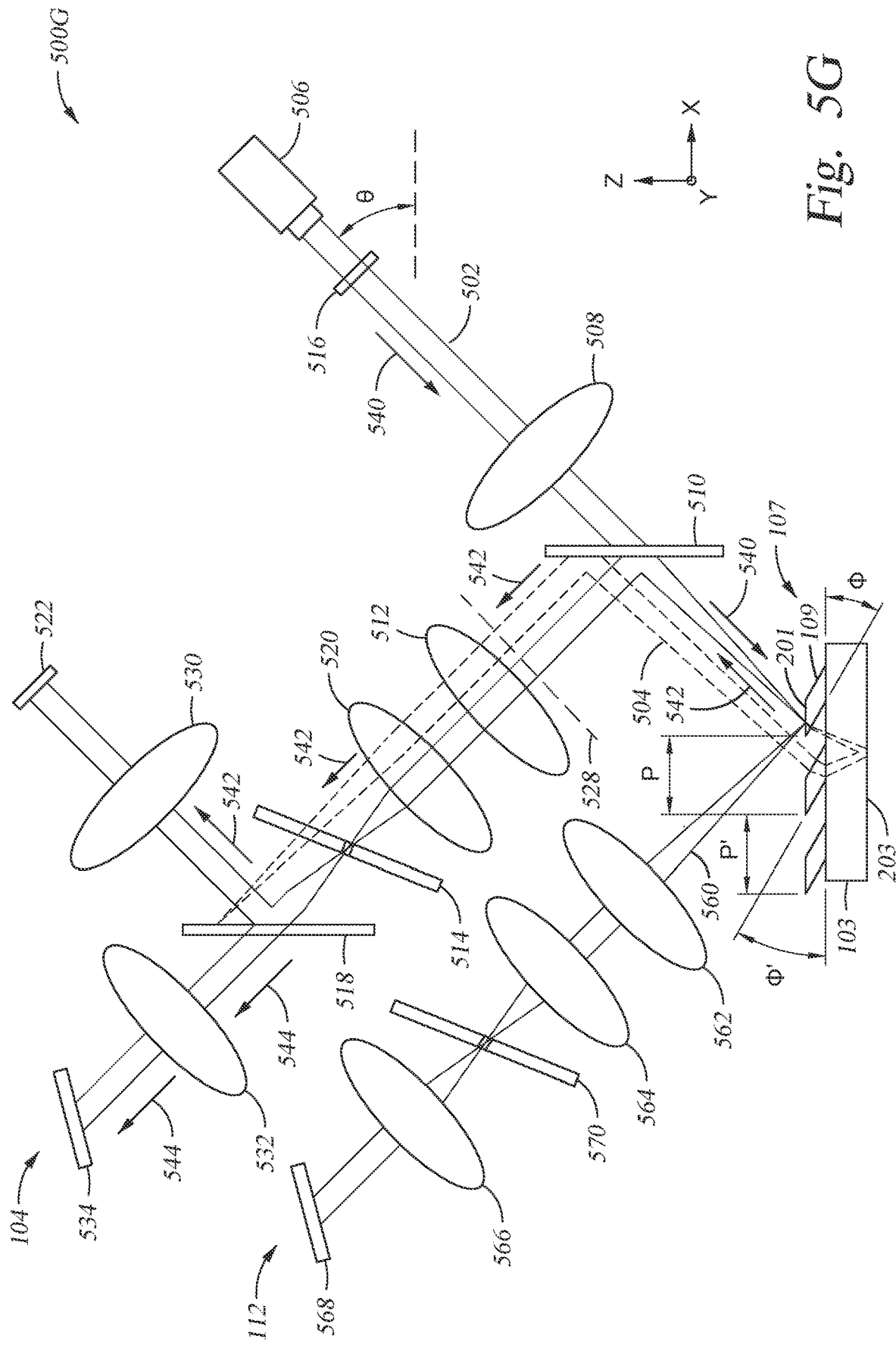
FIG. 5G is a schematic, side-view of a sixth configuration of a measurement arm and a reflection arm according to one embodiment.

FIG. 5G is a schematic, side-view of the sixth configuration 500G of a measurement arm 104 and a reflection arm 112. The sixth configuration 500G of the measurement arm 104 is described above. The reflection arm 112 includes a first reflection arm lens 562, a second reflection arm lens 564, a third reflection arm lens 566, a reflection arm detector 568, and a reflection arm aperture 570. The reflection arm 112 is operable to measure a reflection beam 560 reflected off a top surface 201 of the optical device structure 109 to be measured. In one example, the reflection arm 112 is disposed directly opposite of the measurement arm 104. Although the reflection arm 112 is shown in FIG. 5G with the sixth configuration 500G of the measurement arm 104, any of the configurations of the measurement arm 104 can be paired with the reflection arm 112.

The reflection arm aperture 570 is disposed between the second reflection arm lens 564 and the third reflection arm lens 566. The reflection arm aperture 570 is positioned such that the reflection beam 560 is allowed to pass through the reflection arm aperture 570. In one embodiment, which can be combined with other embodiments described herein, the reflection arm aperture 570 may be perpendicular to the direction of projection of the reflection beam 560 (e.g., perpendicular to direction of propagation of the reflection beam 560). In another embodiment, which can be combined with other embodiments described herein, the reflection arm aperture 570 may be at a reflection aperture angle relative to the direction of projection of the reflection beam 560.

The third reflection arm lens 566 relays the reflection beam 560 from the second reflection arm lens 564 to the reflection arm detector 568. The reflection arm detector 568 is operable to obtain data relating to stage conditions of the stage 102. The reflection arm 112 will monitor the angular change from the stage 102 while scanning, such that the impact of stage conditions (e.g., stage tip or tilt) during scanning are excluded from the measurement to be obtained with the measurement arm 104. The reflection arm 112 collects the reflection beam from the substrate 103 and can collect data related to bowing of the substrate 103. The reflection arm 112 serves as a reference to the data determined in the measurement arm 104.

In summation, a measurement system having an aperture filtering component and methods of utilizing the measurement system are described herein. The measurement system described herein includes a measurement arm and a stage. The measurement arm projects a light beam to a top surface of an optical device structure. Multi-reflection beams resulting from reflections and diffraction off other surfaces of a non-opaque substrate leads to interference. The measurement arm includes an aperture (e.g., an aperture filtering component) that filters the multi-reflection beams from being relayed to the detector. As such, only images of the light beam are relayed to the detector. The images allow for the measurement of pitch and orientation angle across the substrate. The aperture allows for an improvement in accuracy, precision, and reliability of the measurements by filtering out the interference from the multi-reflection beams.

While the foregoing is directed to embodiments of the present disclosure, other and further embodiments of the disclosure may be devised without departing from the basic scope thereof, and the scope thereof is determined by the claims that follow.

What is claimed is:

1. A measurement system, comprising:
   a stage having a substrate support surface, the stage coupled to a stage actuator configured to move the stage in a scanning path and rotate the stage about an axis; and
   a measurement arm disposed above the stage, the measurement arm configured to direct a light beam to a substrate disposed on the substrate support surface, the measurement arm including:
   a light source, the light source configured to project the light beam to the substrate disposed below the light source;
   a first lens disposed between the substrate and the light source, the first lens configured to focus the light beam to the substrate;
   a first beam splitter disposed between the first lens and the light source;
   a second lens disposed adjacent to the first beam splitter, the first beam splitter configured to direct the light beam to the second lens, the second lens configured to direct the light beam to a mirror;
   an aperture disposed in front of the mirror;
   a second beam splitter, the second beam splitter configured to direct the light beam to a third lens from the mirror; and
   a detector, wherein the light beam is projected to the detector by the third lens.

2. The measurement system of claim 1, wherein the first lens is a focusing lens.

3. The measurement system of claim 1, wherein the third lens is configured to relay an original image of the light beam at a Fourier plane to the detector, wherein the Fourier plan is formed adjacent to the second lens.

4. The measurement system of claim 1, wherein the aperture has an aperture size between about 50 μm to about 1 mm.

5. The measurement system of claim 1, further comprising a reticle disposed between the first beam splitter and the light source.

6. The measurement system of claim 5, wherein the reticle includes a marker thereon, wherein the marker is a cross, circular, or triangular.

7. The measurement system of claim 1, wherein the detector is a charge-coupled device (CCD) array or an active-pixel sensor (CMOS array).

8. The measurement system of claim 1, wherein the measurement arm comprises an arm actuator and the arm actuator is configured to rotate the measurement arm about a z-axis and scan the measurement arm in a z-direction.

9. The measurement system of claim 1, wherein the light source operates in a wavelength range from 400 nanometers to 700 nanometers.

10. The measurement system of claim 1, wherein the second lens is a converging lens and the third lens is a relay lens.

11. A measurement system, comprising:
    a stage having a substrate support surface, the stage coupled to a stage actuator configured to move the stage in a scanning path and rotate the stage about an axis; and
    a measurement arm disposed above the stage, the measurement arm configured to direct a light beam to a substrate disposed on the substrate support surface, the measurement arm including:
    a light source, the light source configured to project the light beam to the substrate disposed below the light source;
    a first lens disposed between the substrate and the light source, the first lens configured to focus the light beam to the substrate;
    a first beam splitter disposed between the first lens and the light source;
    a second lens disposed adjacent to the first beam splitter, the first beam splitter configured to direct the light beam to the second lens;
    an aperture, the second lens configured to direct the light beam through the aperture;
    a third lens; and
    a detector, wherein the light beam is projected to the detector by the third lens.

12. The measurement system of claim 11, wherein the first lens is a focusing lens.

13. The measurement system of claim 11, wherein the third lens is configured to relay an original image of the light beam at a Fourier plane to the detector, wherein the Fourier plan is disposed adjacent to the second lens.

14. The measurement system of claim 11, wherein the measurement arm is coupled to an arm actuator configured to scan the measurement arm and rotate the measurement arm about the axis.

15. The measurement system of claim 11, wherein the measurement arm further comprises:
    a first linear polarizer disposed adjacent to the light source;
    a second linear polarizer disposed between the first beam splitter and the third lens;
    a first waveplate disposed between the first beam splitter and the first lens; and
    a second waveplate disposed between the second lens and the first beam splitter.

16. The measurement system of claim 11, wherein the detector is a charge-coupled device (CCD) array or an active-pixel sensor (CMOS array).

17. The measurement system of claim 11, further comprising a reflection arm disposed above the stage.

18. The measurement system of claim 17, wherein the reflection arm is coupled to an arm actuator configured to scan the reflection arm and rotate the reflection arm about the axis.

19. The measurement system of claim 18, wherein the reflection arm comprises:
   a first reflection arm lens;
   a second reflection arm lens adjacent to the first reflection arm lens;
   a third reflection arm lens;
   a reflection arm aperture disposed between the second reflection arm lens and the third reflection arm lens; and
   a reflection arm detector, wherein the third reflection arm lens directs a reflection beam to the reflection arm detector.

20. The measurement system of claim 11, wherein the aperture is disposed at an aperture angle, wherein the aperture angle is non-perpendicular relative to a projection direction of the light beam.

* * * * *

UNITED STATES PATENT AND TRADEMARK OFFICE
CERTIFICATE OF CORRECTION

| | | |
|---|---|---|
| PATENT NO. | : 12,398,998 B2 | Page 1 of 1 |
| APPLICATION NO. | : 18/118269 | |
| DATED | : August 26, 2025 | |
| INVENTOR(S) | : Yangyang Sun et al. | |

It is certified that error appears in the above-identified patent and that said Letters Patent is hereby corrected as shown below:

In the Drawings

On sheet 5 of 12, in FIG. 4, reference numeral 405, Line 1, delete "OPERTAIONS" and insert -- OPERATIONS --.

In the Specification

In Column 9, Line 25, delete "positon" and insert -- position --.

In Column 10, Line 60, delete "4)." and insert -- $\phi$. --.

In Column 13, Line 38, delete "The fifth lens 532 is disposed between the second beam" and insert the same on Line 37, as a continuation of the same paragraph.

Signed and Sealed this
Tenth Day of February, 2026

John A. Squires
*Director of the United States Patent and Trademark Office*